United States Patent
Liu et al.

(10) Patent No.: US 7,229,194 B2
(45) Date of Patent: Jun. 12, 2007

(54) DIRECT-TYPE BACKLIGHT UNIT STRUCTURE

(75) Inventors: Pang-Hsuan Liu, Hsin-Chu (TW); Mei-Fen Lin, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 11/218,629

(22) Filed: Sep. 6, 2005

(65) Prior Publication Data
US 2006/0274550 A1   Dec. 7, 2006

(30) Foreign Application Priority Data
Jun. 1, 2005   (TW) ............................... 94118083 A

(51) Int. Cl.
*F29V 7/06* (2006.01)
(52) U.S. Cl. .................. 362/225; 362/29; 362/247; 362/237; 362/249
(58) Field of Classification Search ............ 362/613, 362/29, 30
See application file for complete search history.

(56) References Cited

U.S. PATENT DOCUMENTS 5,008,658 A * 4/1991 Russay et al. ............... 345/87
6,257,737 B1 * 7/2001 Marshall et al. ............ 362/231
6,883,932 B2 * 4/2005 Pan et al. .................... 362/225
2006/0158080 A1 * 7/2006 Nakano et al. ............. 313/113

\* cited by examiner

*Primary Examiner*—Laura Tso
(74) *Attorney, Agent, or Firm*—Rosenberg, Klein & Lee

(57) ABSTRACT

This invention discloses a direct-type backlight unit structure, which at least comprises at least one light generation component and at least one reflection mirror. The light generation component is used to generate a light and the reflection mirror is set in a side of the light generation component, wherein the reflection mirror faces to the light generation component to form a paraboloid and the paraboloid extends till a top of the light generation component. The reflection mirror can also be set on the top of the light generation component, and faces to the light generation component to form two paraboloids from a center line of the top of the light generation component. The light generated from the light generation component, especially the upward light, can be reflected by the reflection mirror to turn toward the side direction, and finally intermix uniformly in a mixed space, and pass through a light emitting surface to form a uniform backlight.

16 Claims, 9 Drawing Sheets

DIRECT-TYPE BACKLIGHT UNIT STRUCTURE

FIELD OF THE INVENTION

The present invention generally relates to a direct-type backlight unit structure and, more particularly, to a direct-type backlight unit structure having a reflection mirror.

BACKGROUND OF THE INVENTION

Liquid Crystal Display (LCD) panels are now in widespread use, such as LCD TV, cell phones, digital cameras, etc. Liquid crystals are unable to emit lights that need a backlight unit to provide lights for LCD panels. The backlight unit can be separated into the Direct-Type backlight unit and the Side-Edge Type backlight unit. Currently the direct-type backlight unit is a main stream because of advantages with high-efficiency and less assembly parts.

Referring to FIG. 1, a structural drawing of a conventional direct-type backlight unit structure is illustrated. The conventional direct-type backlight unit structure at least comprises a plurality of light generation components 11, a light emitting surface 12, and at least one reflection surface 13. The light generation component 11 is used to generate lights and the light generation component 11 can be a Light Emitting Diode (LED) or a Cold Cathode Fluorescent Lamp (CCFL). In general, LED is current trend. In addition, the light emitting surface 12 is usually set on the light generation component 11. The light generated from the light generation component 11 can pass through the light emitting surface 12 for producing a uniform backlight. The light generation component 11 usually generates the light without specific directions that proceeds everywhere. Therefore, the reflection surface 13 is set in the side of the backlight unit. The light proceeds to the backlight unit that is then reflected by the reflection surface 13 for mixing in a mixed space 14. The mixing efficiency will be better when the height of the mixed space 14 is higher that can generate a uniform backlight. The design in the direct-type backlight unit structure is required to be a thin type as lowering the height of the light generation component 11. In another word, the mixing efficiency in the direct-type backlight unit will be sacrificed. Furthermore, the light generation component has been improved to generate a light with higher brightness that decreases the amount of the light generation component to achieve the same brightness. Consequently, the mixing efficiency is worse to generate a backlight without well mixed.

Referring to FIG. 2, a structural drawing of another conventional direct-type backlight unit structure is illustrated. The conventional direct-type backlight unit structure at least comprises a plurality of light generation components 21, a light emitting surface 12, and at least one reflection surface 13. The light generation component 21 can be a Side Emitting LED that comprises a lens 211 to take the light (especially in an upward light) generated from the light generation component 21 that utilizes reflecting or refracting to toward two sides for emitting, as shown in a dotted line 212. The light is reflected by the reflection surface 13 while proceeding to the side of the backlight unit and the reflected light is then mixed in a mixed space 22 that passes through the light emitting surface 12 to generate a uniform backlight. Above direct-type backlight unit structure uses the mixed space 22 with the lower height to achieve well mixed. However, the price for the light generation component 21 is expensive that increases the cost of the conventional direct-type backlight unit structure.

Referring to FIG. 3, a structural drawing of third conventional direct-type backlight unit structure is illustrated. The third conventional direct-type backlight unit structure at least comprises a plurality of light generation components 31, a plurality of reflection plates 32, and a light guide plate 33. The light generation component 31 can be a LED with high brightness that is used to generate a light (including the upward light). The reflection plate 32 is used to reflect the upward light that takes the reflected upward light to enter the light guide plate from the side 331 of the light guide plate 33. The light guide plate 33 is used to guide the direction of the light that takes the liner light to scatter to be a uniform area light in order to generate a uniform backlight from the top. The third conventional direct-type backlight unit structure further comprises at least one reflection surface 13 that is used to reflect the scattering light to back to the light guide plate in order to avoid fleeing and improve efficiency. However, the third conventional direct-type backlight unit structure needs the light guide plate 33 that increases the weight and the light guide plate 33 absorbs a part of the light that decreases the efficiency. Above disadvantages must be resolved by providing a direct-type backlight unit structure having a reflection mirror.

SUMMARY OF THE INVENTION

Briefly, the object of the present invention is to provide a direct-type backlight unit structure that comprises at least one light generation component and at least one reflection mirror. The light generation component is used to generate a light. The reflection mirror is set in a side of the light generation component that faces to the light generation component to form a paraboloid and the paraboloid extends till a top of the light generation component. Also the reflection mirror can be set on a top of the light generation component that faces to the light generation component to form two paraboloids from a center line of the top of the light generation component. The light is generated by the light generation component, especially in an upward light, can be reflected by the reflection mirror to proceed toward the side. Lastly, the light is well mixed in a mixed space that transmits to form a uniform backlight from a light emitting surface. In addition, the light generation component further can be a group with a string of light generation components that is composed of a plurality of LEDs for emitting at least two color lights.

Accordingly, the direct-type backlight unit structure could resolve problems in conventional direct-type backlight unit structures, including the higher mixed space, the bad mixing efficiency, the higher assembly cost, etc.

DETAILED DESCRIPTION OF THE PREFERRED EMBODIMENTS

To make it easier for our examiner to understand the objective of the invention, its innovative features and performance, a detailed description and technical characteristics of the present invention are described together with the drawings as follows.

Figure 1:
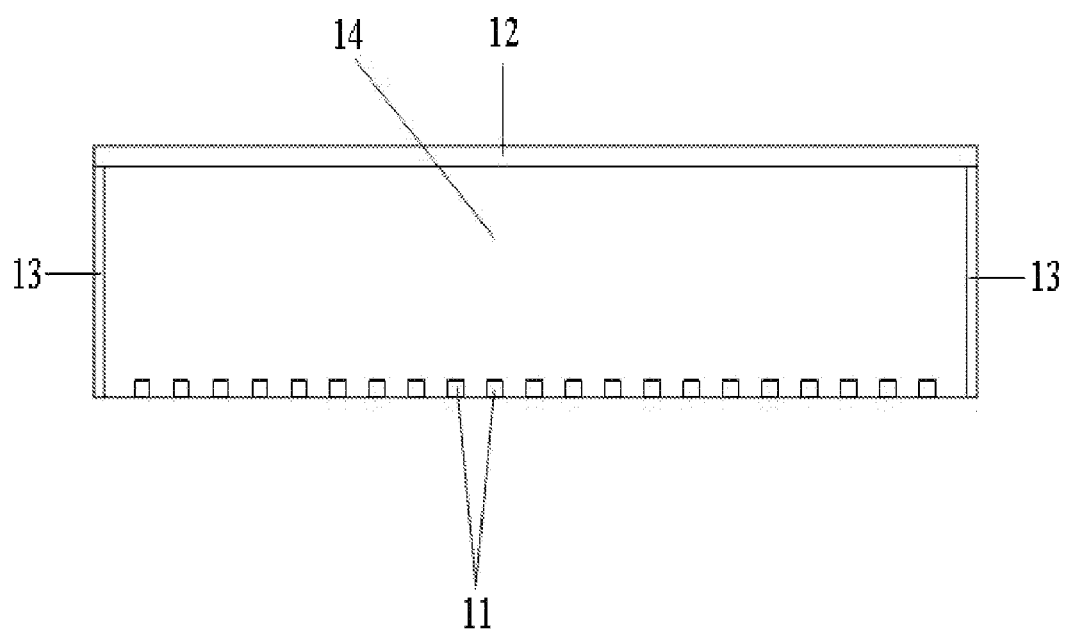
FIG. 1 is a structural drawing of a conventional direct-type backlight unit structure.
Figure 2:
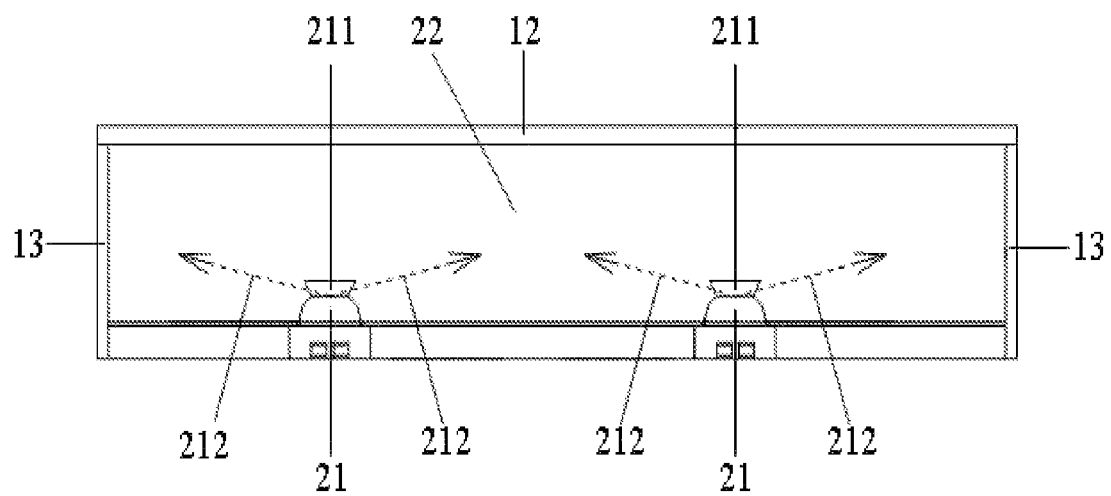
FIG. 2 is a structural drawing of another conventional direct-type backlight unit structure.
Figure 3:
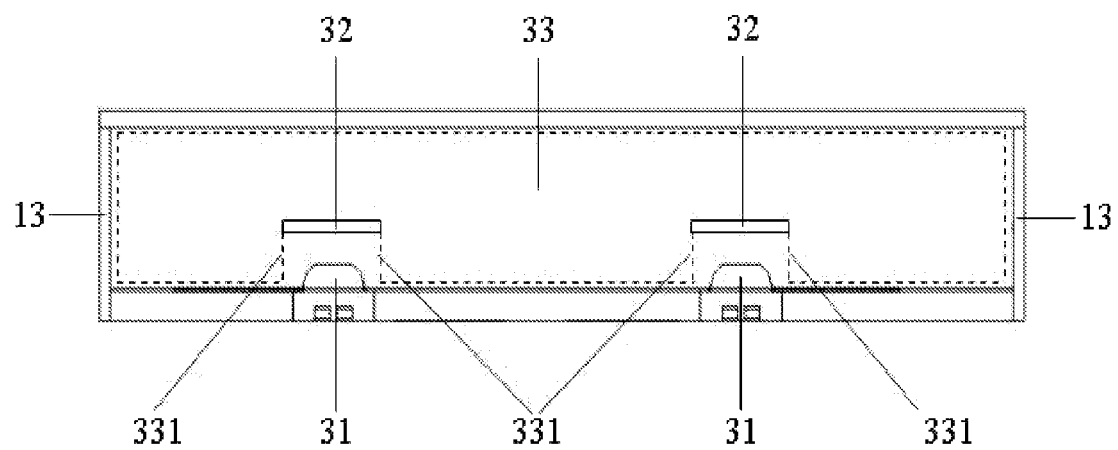
FIG. 3 is a structural drawing of third conventional direct-type backlight unit structure.
Figure 4:
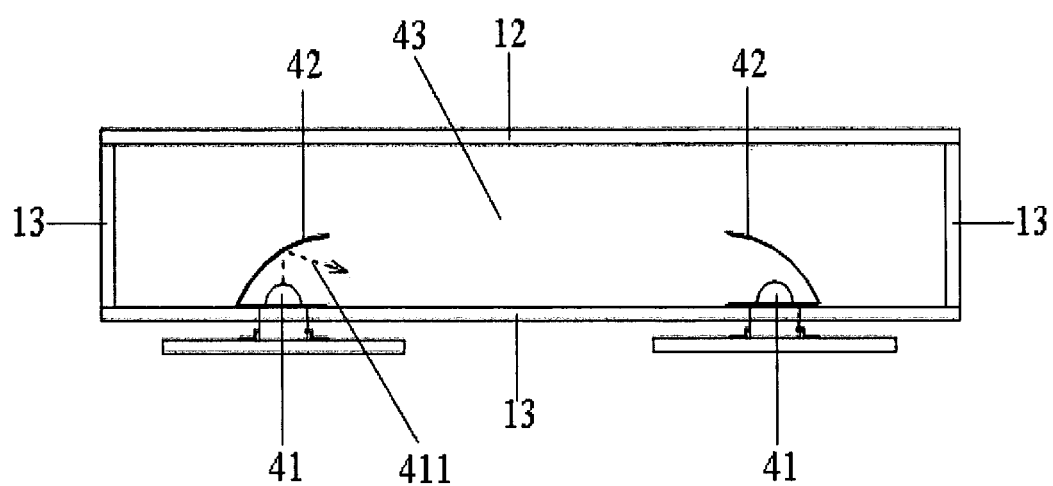
FIG. 4 is a structural drawing of an example of a direct-type backlight unit structure according to an embodiment of the present invention.
Figure 5:
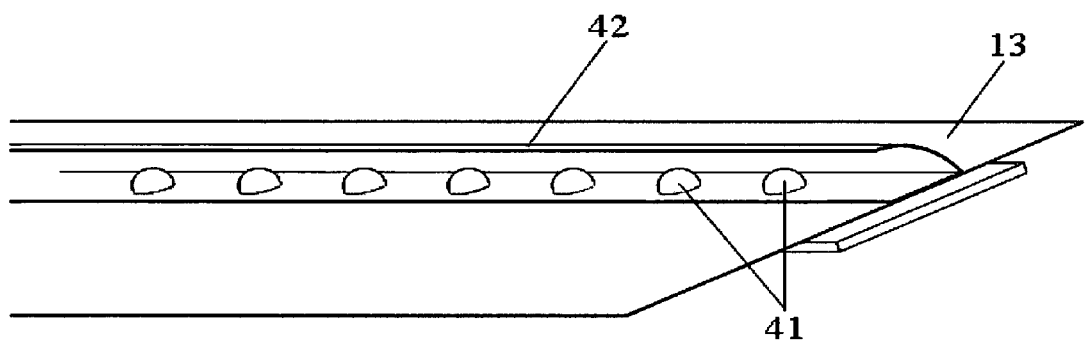
FIG. 5 is a three-dimensional (3D) diagram according to FIG. 4.

Referring to FIG. 4, a structural drawing of an example of a direct-type backlight unit structure according to an embodiment of the present invention is illustrated. The direct-type backlight unit structure comprises at least one light generation component 41 and at least one reflection mirror 42. The light generation component 41 can be a LED for producing a light and the light generation component 41 further can be a group with a string of light generation components, wherein the light can be a red light, a blue light, or a green light. The LED can be a red LED, a blue LED, or a green LED. The reflection mirror 42 is set in a side of the light generation component 41 that face to the light generation component 41 to form a paraboloid and the paraboloid extends till a top of the light generation component 41. The reflection mirror 42 is used to reflect the light from the light generation component 41, especially in an upward light, can be reflected to the side, as shown in a dotted line 411. The direct-type backlight unit structure further comprises a reflection surface 13 and a mixed space 43. Afterward the light proceeds to the side of a backlight unit or the button of a backlight unit that is reflected by the reflection surface 13 for mixing in the mixed space 43. The mixed space 43 further comprises a light emitting surface 12 that is set on the light generation component 41 and the reflection mirror 42. The light is transmitted to form a uniform backlight from the light emitting surface 12. Referring to FIG. 5, a three-dimensional diagram is illustrated according to FIG. 4. The light generation component 41 is a group with a string of light generation components. The reflection mirror 42 is a paraboloid shape and the reflection mirror 42 is set on the plurality of light generation components.

Figure 6:
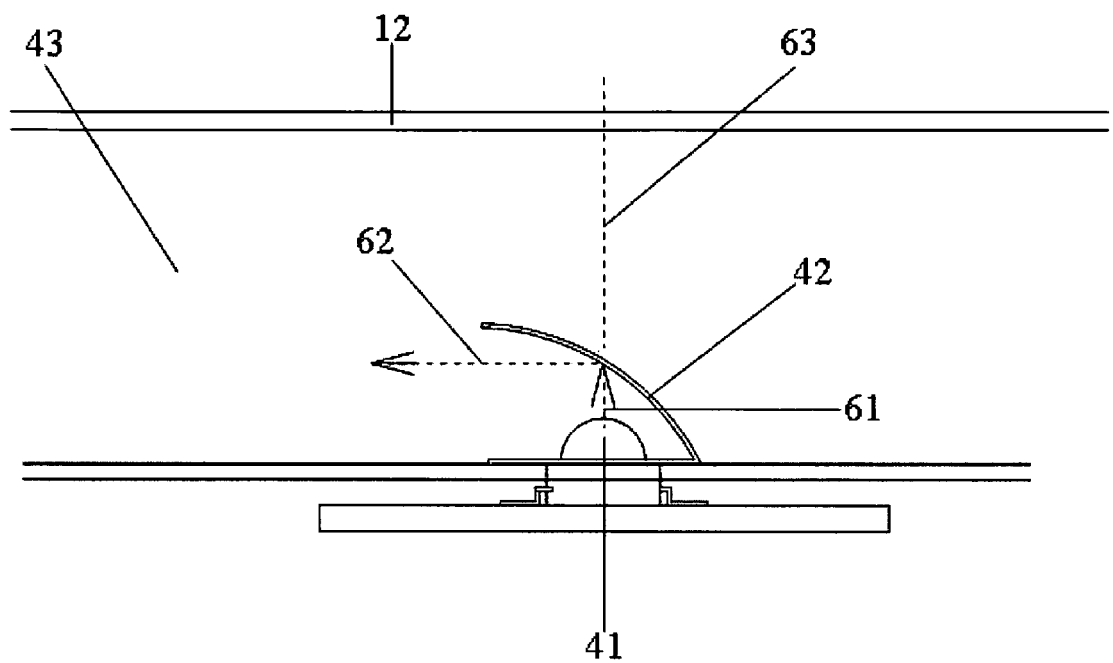
FIG. 6 is another diagram according to FIG. 4.

Referring to FIG. 6, another diagram is illustrated according to FIG. 4. The reflection mirror 42 is the paraboloid shape and is integrated as a whole. The center of the light generation component 41 is set near the paraboloid center of the reflection mirror 42. The light which is emitted from the light generation component can be called an emitting light 61. The light which is reflected from the reflection mirror 42 can be called a reflective light 62. A normal 63 of the light emitting surface 12 is vertically to the light emitting surface 12. An included angle between the reflective light 62 and the normal 63 of the light emitting surface 12 is from 60° to 120° when an included angle between the emitting light 61 and the normal 63 of the light emitting surface 12 is from 0° to 50°. The light can be reflected to the side for proceeding from upward direction in order to be mixed in the mixed space 43. The reflection mirror 42 reflects most lights, hence the design reduces the height of the mixed space 43, so as to achieve well mixed condition and generate a uniform backlight without light guide plates.

Figure 7:
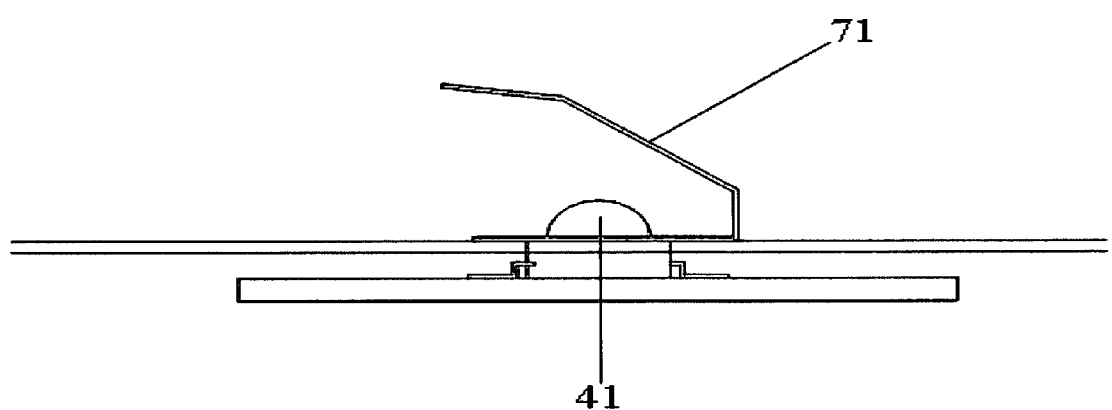
FIG. 7 is a structural drawing of an example of another direct-type backlight unit structure according to an embodiment of the present invention.

Referring to FIG. 7, a structural drawing of an example of another direct-type backlight unit structure according to an embodiment of the present invention is illustrated. The direct-type backlight unit structure at least comprises a light generation component 41 and a reflection mirror 71, wherein the reflection mirror 71 is set in a side of the light generation component 41 that faces to the light generation component 41 to form a paraboloid and the paraboloid extends till a top of the light generation component 41. The paraboloid is composed of a plurality of plain surfaces. As same as mentioned above, the design in FIG. 7 could also achieve well mixed condition.

Figure 8:
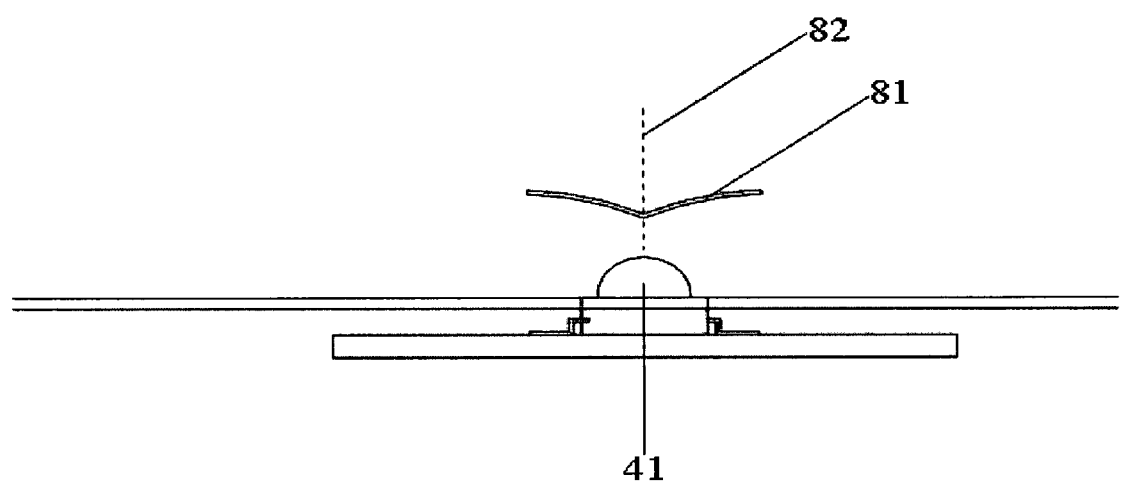
FIG. 8 is a structural drawing of an example of third direct-type backlight unit structure according to an embodiment of the present invention.

Referring to FIG. 8, a structural drawing of an example of third direct-type backlight unit structure according to an embodiment of the present invention is illustrated. The direct-type backlight unit structure at least comprises a light generation component 41 and a reflection mirror 81. The reflection mirror 81 is set on a top of the light generation component 41 and the reflection mirror 81 faces to the light generation component 41 to form two paraboloids from a center line 82 of the top of the light generation component 41. The reflection mirror 81 is integrated as a whole. The reflection mirror 81 is used to reflect the light generated from the light generation component 41, especially in an upward light, can be reflected to two sides for mixing. The design in FIG. 8 could also achieve well mixed condition.

Figure 9:
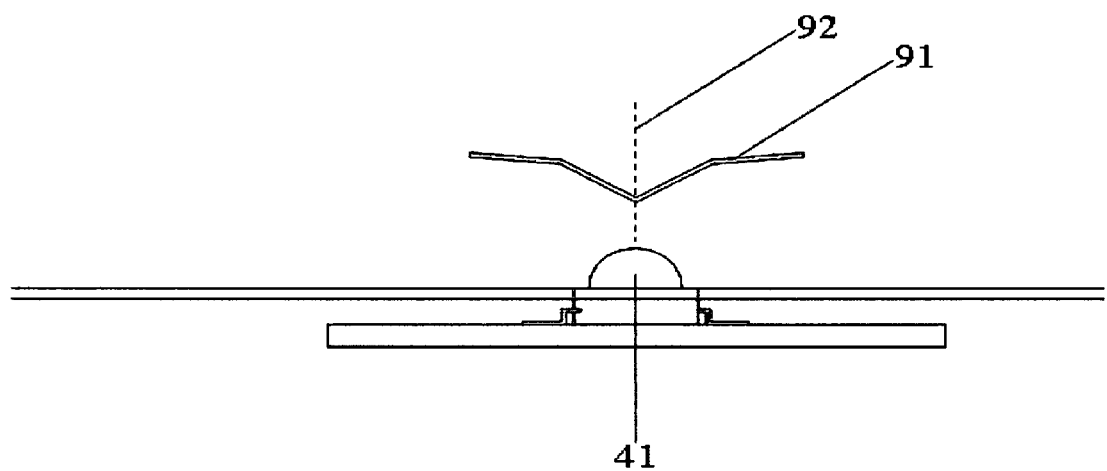
FIG. 9 is a structural drawing of an example of fourth direct-type backlight unit structure according to an embodiment of the present invention.

Referring to FIG. 9, a structural drawing of an example of fourth direct-type backlight unit structure according to an embodiment of the present invention is illustrated. The direct-type backlight unit structure at least comprises a light generation component 41 and a reflection mirror 91. The reflection mirror 91 is set on a top of the light generation component 41 and the reflection mirror 91 faces to the light generation component 91 to form two paraboloids from a center line 92 of the top of the light generation component and the paraboloid is composed of a plurality of plain surfaces. As same as mentioned above, the design in FIG. 9 could also achieve well mixed condition.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the description above, the present invention is novel and useful and definite enhances the performance over the conventional structure and further complies with the patent application requirements and is submitted to the Patent and Trademark Office for review and granting of the commensurate patent rights.

What is claimed is:

1. A direct-type backlight unit structure, comprising:
   at least one light generation component; and
   at least one reflection mirror disposed around a side of said light generation component, wherein said reflection mirror faces said light generation component, said reflection mirror forms a paraboloid contour defining a paraboloid leaf, said paraboloid leaf extending above said light generation component, said light generation component being displaced from the focal point of the paraboloid leaf, whereby the light incident on said paraboloid leaf is reflected diffusely to a substantially planar rear reflecting surface where the light will be further reflected to a front light emitting surface.

2. The direct-type backlight unit structure of claim 1, wherein said light generation component comprises a Light Emitting Diode (LED).

3. The direct-type backlight unit structure of claim 1, wherein said light generation component comprises a string of Light Emitting Diodes (LEDs).

4. The direct-type backlight unit structure of claim 1, wherein said paraboloid is composed of a plurality of plain surfaces.

5. The direct-type backlight unit structure of claim 4, wherein said reflection mirror is integrated as a whole.

6. The direct-type backlight unit structure of claim 1 further comprises a mixed space.

7. The direct-type backlight unit structure of claim 6, wherein said mixed space further comprises a light emitting surface, set on said light generation component and said reflection mirror.

8. The direct-type backlight unit structure of claim 7, wherein an included angle between an emitting light and a normal of said light emitting surface is from 0° to 50°.

9. The direct-type backlight unit structure of claim 8, wherein an included angle between a reflective light and a normal of said light emitting surface is from 60° to 120°.

10. A direct-type backlight unit structure, comprising:
   at least one light generation component; and
   at least one reflection mirror located above said light generation component, wherein said reflection mirror faces said light generation component and forms two paraboloid contours having an apex point vertically located above said light generation component, whereby light is reflected from the paraboloids in a diffuse manner.

11. The direct-type backlight unit structure of claim 10, wherein said light generation component comprises a Light Emitting Diode (LED).

12. The direct-type backlight unit structure of claim 10, wherein said light generation component comprises a string of Light Emitting Diodes (LEDs).

13. The direct-type backlight unit structure of claim 10, wherein said paraboloid is composed of a plurality of plain surfaces.

14. The direct-type backlight unit structure of claim 10, wherein said reflection mirror is integrated as a whole.

15. The direct-type backlight unit structure of claim 10 further comprising a mixed space.

16. The direct-type backlight unit structure of claim 15, wherein said mixed space further comprises a light emitting surface, said light emitting surface is set on said reflection mirror.

* * * * *